United States Patent [19]

Noddin et al.

[11] Patent Number: 5,130,134
[45] Date of Patent: Jul. 14, 1992

[54] POLYIMIDE COMPOSITE FILTER FABRICS

[75] Inventors: E. Lee Noddin, Auburn, Me.; Mark R. Aitken, Minesing, Canada

[73] Assignees: Albarrie Canada Limited, Barrie, Canada; Albarrie Technical Fabrics, Inc., Lewiston, Me.

[21] Appl. No.: 655,765

[22] Filed: Feb. 14, 1991

Related U.S. Application Data

[63] Continuation-in-part of Ser. No. 397,030, Aug. 22, 1989, abandoned.

[51] Int. Cl.$^5$ ................................................ B32B 5/16
[52] U.S. Cl. .................................. 428/287; 428/224; 428/280; 428/284; 428/286; 428/302; 210/490; 210/505; 210/508; 210/500.39; 210/500.36; 210/500.43
[58] Field of Search ............... 428/224, 280, 284, 286, 428/287, 302; 210/490, 505, 508, 500.39, 500.36, 500.43

[56] References Cited

U.S. PATENT DOCUMENTS

| | | | |
|---|---|---|---|
| 3,246,767 | 8/1962 | Pall et al. | 210/505 |
| 3,353,682 | 11/1967 | Pall et al. | 210/505 |
| 3,871,850 | 3/1975 | Lenane | 428/300 |
| 3,937,860 | 2/1976 | Gusman | 428/228 |
| 4,093,437 | 6/1978 | Ichihara et al. | 210/508 |
| 4,117,578 | 10/1978 | Forsten | 428/280 |
| 4,324,574 | 4/1982 | Fagan | 428/235 |
| 4,840,838 | 6/1989 | Wyss | 210/505 |
| 4,983,434 | 1/1991 | Sassa | 428/235 |

FOREIGN PATENT DOCUMENTS

| | | |
|---|---|---|
| 0386975 | 1/1990 | European Pat. Off. |
| 1232949 | 5/1971 | United Kingdom |
| 8600570 | 1/1986 | World Int. Prop. O. |

OTHER PUBLICATIONS

Turkson, "Comparison of Performance Characteristics of P84 Composite Fabrics and Other Fabrics in Dust Collectors", Filtration & Separation, Jan., Feb. 1990, pp. 20-21.

Primary Examiner—George F. Lesmes
Assistant Examiner—Beverly A. Pawlikowski
Attorney, Agent, or Firm—Larson and Taylor

[57] ABSTRACT

Composite filter cloths having a top layer of a heavily profiled, electro-statically charged polyimide fiber and a depth filtration type fabric substrate may be structured to have a higher particulate removal efficiency than that for the substrate layer and a lower pressure drop than that of the top layer.

28 Claims, 5 Drawing Sheets

POLYIMIDE COMPOSITE FILTER FABRICS

RELATED APPLICATION

This invention is a continuation in part of U.S. patent application Ser. No. 397,030 filed Aug. 22, 1989, now abandoned.

FIELD OF INVENTION

This invention relates to filter fabrics. It specially relates to filter fabrics having a utility for the removal of fine, sub-micron particulate matter from fluid streams, although it is not restricted thereto.

BACKGROUND OF INVENTION

Filter fabrics made from conventional synthetic fibers, non-limiting examples of which are fibers formed from polyesters, polyamides, polyethylene polypropylene and polyacrylonitrile and glass remove particles from a fluid stream initially by a depth filtration mechanism. Such fibers have relatively regular cross-sections of low surface area. Particulate matter in the fluid stream is trapped in the body of the fabric in the interstices between the fibers thereof, to form a cake in the body of the fabric. It is only subsequent to the formation of the body cake that a surface cake builds up, the surface cake then effectively forming the filter medium. The accumulation of the particles inside the fabric creates an appreciable resistance to the flow of fluid through the filter, and correspondingly results in an increase in pressure drop across the filter.

Fabrics which are composed of membranes laminated onto a fibrous substrate considerably reduce entrapment of the particles within the fabric. However, such membranes have an inherently high flow resistance due to the small pore size thereof, and again their use is accompanied by a high pressure drop across the filter.

There has latterly been made available from Lenzing AG an aromatic polyimide fiber known under the trade name P84. Microscopic examination of these fibers indicates them to have an irregular, heavily profiled structure of significantly greater surface area than that of conventional fibers employed in the manufacture of depth filtration filters. These heavily profiled polyimide fibers also have charged surface sites, which generate strong electrostatic fields.

Filter fabrics constructed from HPEC polyimide fibers are found to intercept particulate matter primarily on the surface thereof in a cake filtration mechanism. Fluid flow through such fabric may be gradually restricted, particularly where the feed includes very fine particles. Such particles penetrate the fabric, and since the path resistance tends to be relatively uniform throughout the depth of the fabric, the probability of entrapment is relatively high.

The P84 polyimide fibers are also very expensive, making them cost-prohibitive except for specialty use in very high temperature filtration operations i.e. 200-250 C.

It is an object of this invention to provide filter cloths having improved efficiency.

It is a further object of this invention to provide filter cloths having a high particulate separation efficiency and accompanied therewith a low pressure build-up.

It is another object of this invention to provide filter cloths that are economic.

SUMMARY OF THE INVENTION

In accordance with a principal aspect of this invention, a composite filter fabric comprises cloth having a composite structure comprising a first fabric layer consisting of a non-woven P84 polyimide fiber, and a substrate fabric layer formed from at least one fiber having a relatively regular cross-section and significantly lower surface area than that of said polyimide fabric; wherein the diameter of the fibers of the substrate layer is not less than the diameter of the fibers of the first layer, and wherein the layers are bonded together.

The P84 polyimide fiber forming the first layer has a theoretical structure

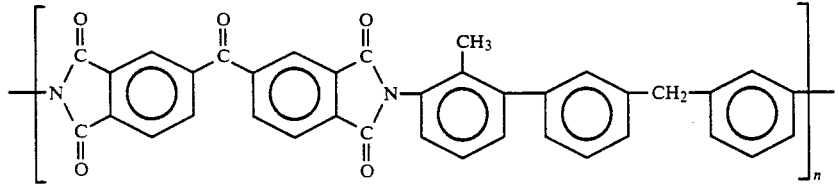

where n is an integer.

The first layer consists of staple fibers of HPEC polyimide polymer consolidated through entanglement of the fibers, such entanglement being of the character produced by a needle punching operation.

The fibers forming the substrate layer are those commonly used in the formation of depth filtration fabrics, and include without limitation fibers from organic polymers such as polyester, polypropylene, polyethylene, nylon, aromatic polyamides, polyacrylonitrile, polyphenylene sulfide, polytetrafluoroethylene, polybenzimidazole, and inorganic materials including glass, and mixtures thereof.

The diameters of the fibers of the first layer and the substrate layer will desirably be selected in accordance with the nature of the particulate matter to be removed from the fluid stream, especially the particle size distribution thereof, so as to ensure the removal of particulate matter without unnecessarily restricting fluid flow through the filter. It is also a prime consideration that the ratio of the diameters of the fibers be selected such that the pressure drop across the substrate will be less, and preferably substantially less than that across the first layer. Accordingly the composite filter fabrics of the invention may have a permeability substantially greater than that of a fabric having a similar weight and thickness formed from fibers of the first layer only. It will be appreciated that the relative diameters of the fibers is only one factor to be considered, together with the path length through each of the layers and also the degree of consolidation of the layers. Generally speaking the diameter of the substrate fibers will be at least equal to that of the fibers of the first layer. Suitably the ratio of the diameter of substrate fiber to that of the fiber of the first layer will be not less than about 1.5:1; and desirably will be in the range of about 1.5:1 to about 4:1, with a ratio of about 3:1 being preferred. The term "diameter" as used herein relates to the mean cross-sectional dimension of the fibers of the layer.

The substrate layer may be in the form of non-woven fabric, or woven fabric or mixtures thereof.

Desirably the substrate layer comprises a non-woven fabric having a woven fabric such as a scrim entangled therewith, suitably by a needle punching operation.

Also suitably, the first layer of fibers is bonded to the substrate layer by needle punching, preferably so as to entangle some of the fibers of each layer by comminglement with fibers of the other layer, desirably without completely penetrating to the outer side of the other layer. It should be clearly understood that the comminglement of fibers of one layer with those of the other layer is for the purpose of mechanically bonding the layers together, and that from the point of view of the efficiency of filtration, it is desirable that the comminglement be minimized.

The first layer will normally comprise not less than about 5% of the composite filter fabric, expressed on a weight basis. Higher percentages of the first layer fabric will normally be found desirable, particularly where elevated temperature exposure maybe expected, but this will be accompanied by an increase in pressure build-up. Suitably a filter fabric having good all-round filtration characteristics for the removal of fine particulate matter will comprise from about 25 to about 35% by weight of the first layer fabric, with about 30% being preferred.

These foregoing objects and aspects of the invention, together with other objects, aspects and advantages thereof will be more apparent from the following description of a preferred embodiment thereof, taken in conjunction with the following drawings.

IN THE DRAWINGS

DESCRIPTION OF THE PREFERRED EMBODIMENT

Figure 1:
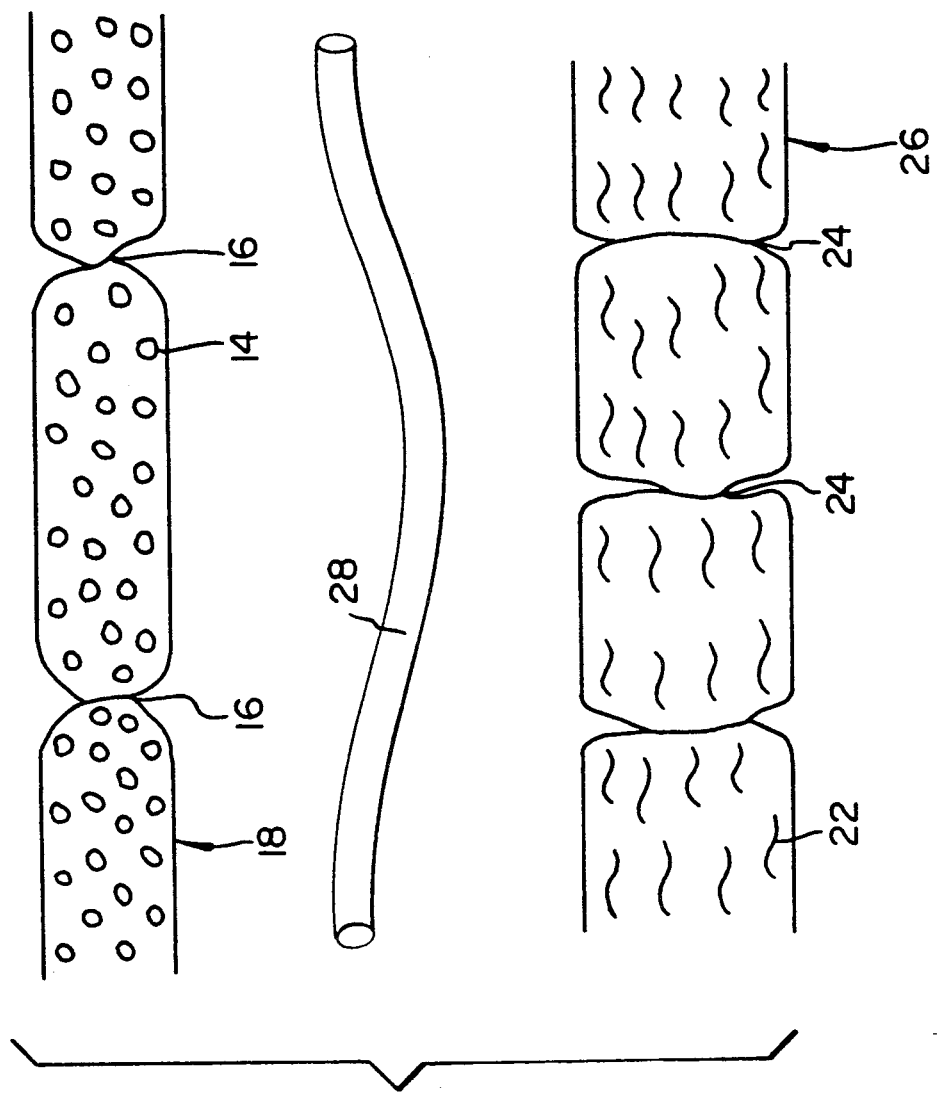
FIG. 1 shows in exploded, figurative form the component parts of a preferred, composite filter fabric of the invention.
Figure 2:
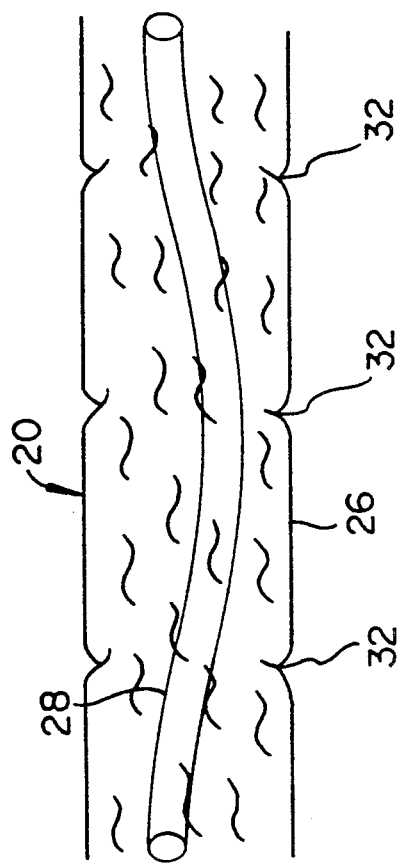
FIG. 2 is similar to FIG. 1 and shows a substage in the manufacture of the composite filter fabric.
Figure 3:
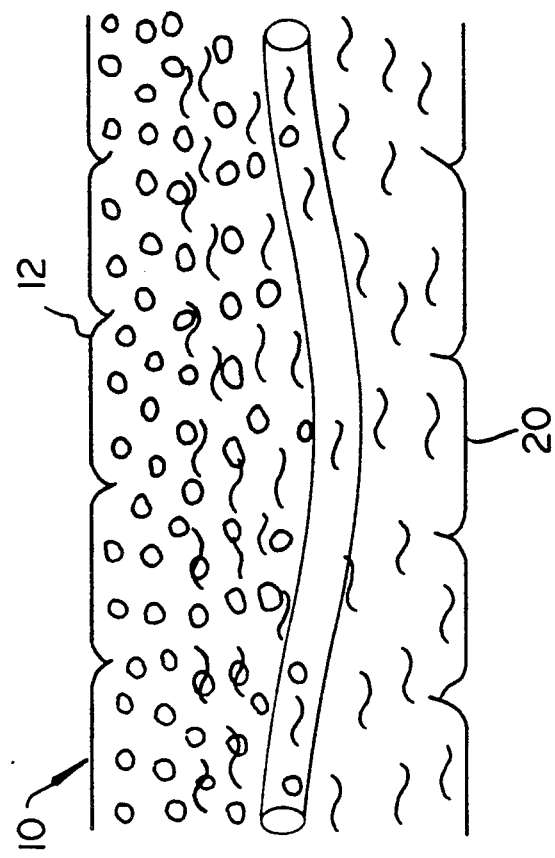
FIG. 3 is similar to FIG. 1 but shows the component parts of the composite filter fabric in their combined form.
Figure 4:
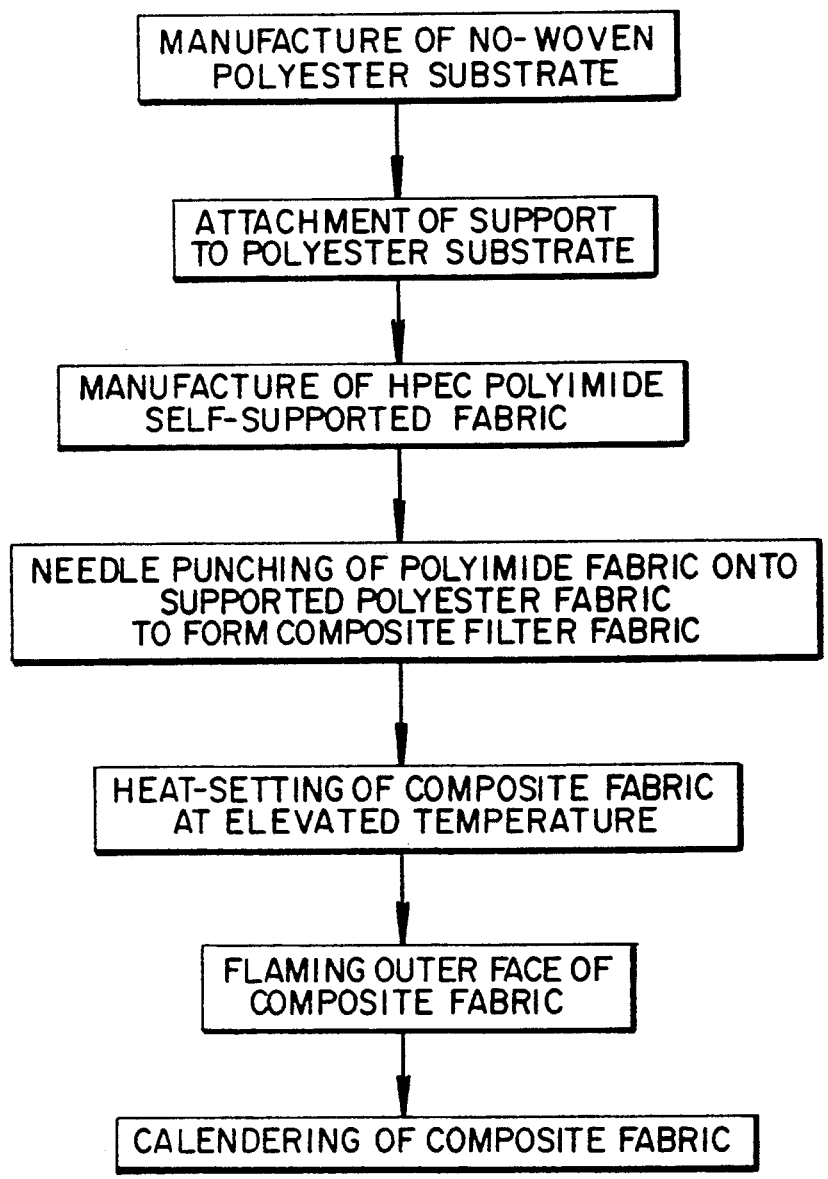
FIG. 4 is a flow diagram of the various steps in the manufacture of a preferred composite filter fabric.

Referring to the drawings in detail, in particular FIGS. 1–3 thereof, a composite filter fabric is identified therein by the numeral 10.

Figure 6:
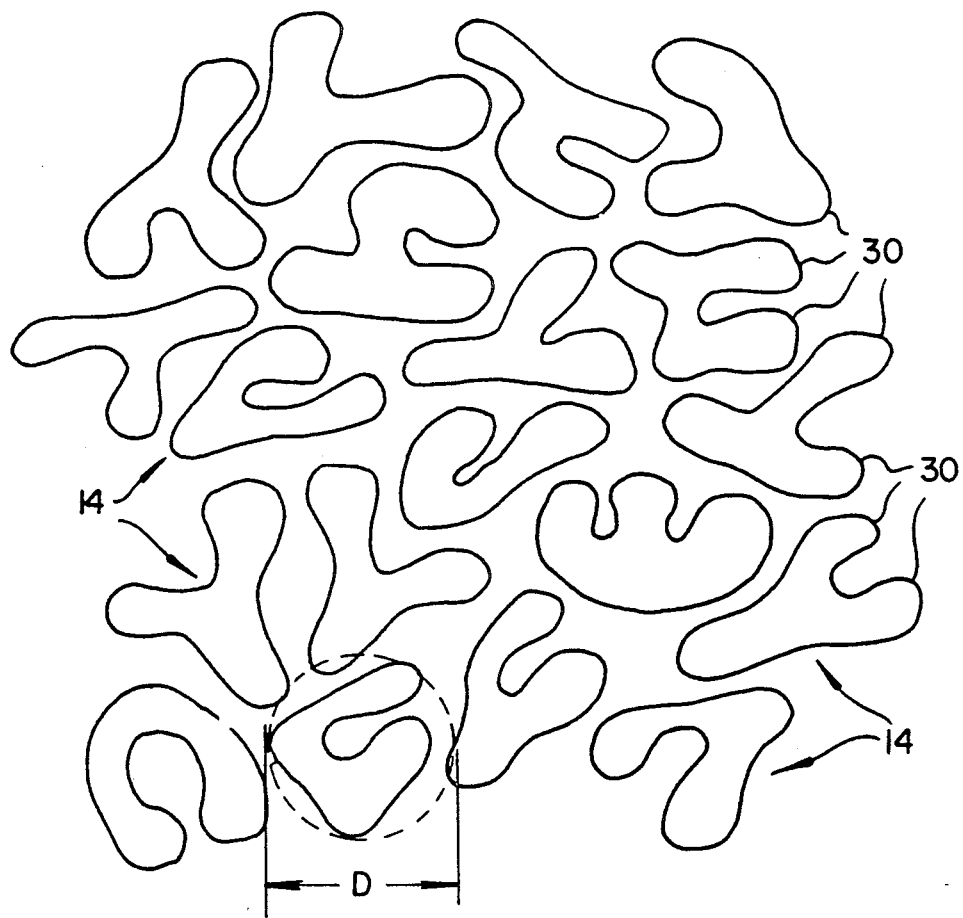
FIG. 6 shows in cross-section P84 polyimide fibers of the first layer.

Filter fabric 10 comprises a first, outer layer 12 which consists essentially of fibers 14 84 polyimide, as previously defined hereinabove, needle punched together at figuratively illustrated sites 16 to form a non-woven fabric 18. Filter fabric 10 further includes a substrate layer 20, which here comprises polyester fibers 22 needle punched together at sites 24 to form a non-woven fabric 26, and a polyester scrim 28. Referring now to FIG. 6, the fiber cross-sections of the P84 polyimide fibers 14 are somewhat irregular, and include a plurality of lobes 30. In comparison fibers used for substrate layer 20 will commonly have a cross-section that is regular in shape, generally round or oval, having a significantly lower ratio of surface area/diameter. The diameter of the P84 fibers is best determined by scanning electron microscope, although a good approximation may be obtained using a digital micrometer and is the circum-circular diameter D of the fibers.

Substrate layer 20 is formed by needle punching non-woven fabric 26 onto scrim 28 at sites 32 so as to generally embed the scrim within the non-woven fabric. Following the formation of substrate layer 20, this layer is bonded to first layer 12 by needle punching fibers from each layer into the other layer. This last recited step is controlled such that the substrate fibers 22 do not penetrate to the outer surface of the first layer, so as not to form a potential low resistance flow path therethrough. The extent of penetration of polyimide fibers 14 into the substrate 20 is commensurate with providing a firm bonding of the layers 12 and 20 together so as to resist disintegration of the filter 10, but penetration is desirably minimized due to the much higher cost of fibers 12, and their providing no effective filtration capacity when embedded into the substrate layer.

Filter fabric 10 is shrunk by heat setting in a hot air chamber at a temperature somewhat more elevated than that to which the fabric 10 will be exposed on a continuous basis during operation. During the heat setting step the filter fabric 10 is desirably tensioned at least across the width thereof to prevent non-uniform shrinkage and a resulting non-uniform outer layer 12.

Following the heat setting step, the outer surface of first layer 12 is exposed to open flame in order to eliminate loose fibers, the presence of which facilitates attachment of particles to the surface of filter cloth 10, making cake removal more difficult during the fabric cleaning cycles.

As a last step in the method, filter 10 is compressed by passage through heated calendering rolls in order to reduce the interstitial spacing between the fibers and control the permeability to desired levels.

A composite filter fabric was formed in accordance with the above method wherein the P84 polyimide fibers had a diameter of 2 denier, and the fabric of the first layer 12 formed therefrom had a weight of 125 g/m$^2$. The substrate layer 20 was formed from a 6 denier polyester nonwoven fabric having a weight of 285 g/m$^2$ needle punched onto polyester spun yarn scrim having a weight of 50 g/m$^2$. The composite fabric is usable bn a continuous basis at a temperature of about 150° C, and was heat set at a temperature of 195° C. The permeability of this composite fabric was about 60% greater than that of a non-composite P84 polyimide fabric of comparable weight and thickness.

A further composite filter fabric was formed in accordance with the above method, and was tested for filter efficiency and compared with a conventional polyester filter fabric having a comparable weight and thickness, the characteristics of the two filter fabrics being as given in Table 1.

TABLE 1

| characteristics of composite and control filter fabrics. | | |
|---|---|---|
| Fabric Construction | P84 Polyimide/Polyester Composite | Polyester (Control) |
| Weight g/m$^2$ | 552 | 554 |
| Thickness mm | 1.73 | 1.65 |

TABLE 1-continued

| characteristics of composite and control filter fabrics. | | |
|---|---|---|
| Fabric Construction | P84 Polyimide/Polyester Composite | Polyester (Control) |
| Permeability CFM | 44.0 | 22.9 |

Samples of the two fabrics of Table 1 were compared for particulate removal efficiency and pressure buildup at various particle concentrations and flow rates. The particulate matter consisted of a dust taken from a fluidized bed recirculating type boiler. The particles had a median size of 0.445 microns, with 82.31% of the population below 1 micron. The duration of the runs was 20 hours. The separation efficiency and pressure buildup were measured simultaneously versus time.
The selected particle concentrations were as follows:
1) 11 g/m$^3$ (5.0 Grains/ft$^3$)
2) 110 g/m$^3$ (50 Grains/ft$^3$)

The air flow rates to which both fabrics were subjected were:
1) 1.22 m/min (4 ft/min)
2) 1.52 m/min (5 ft/min)
3) 2.13 m/min (7 ft/min)

Figure 5:
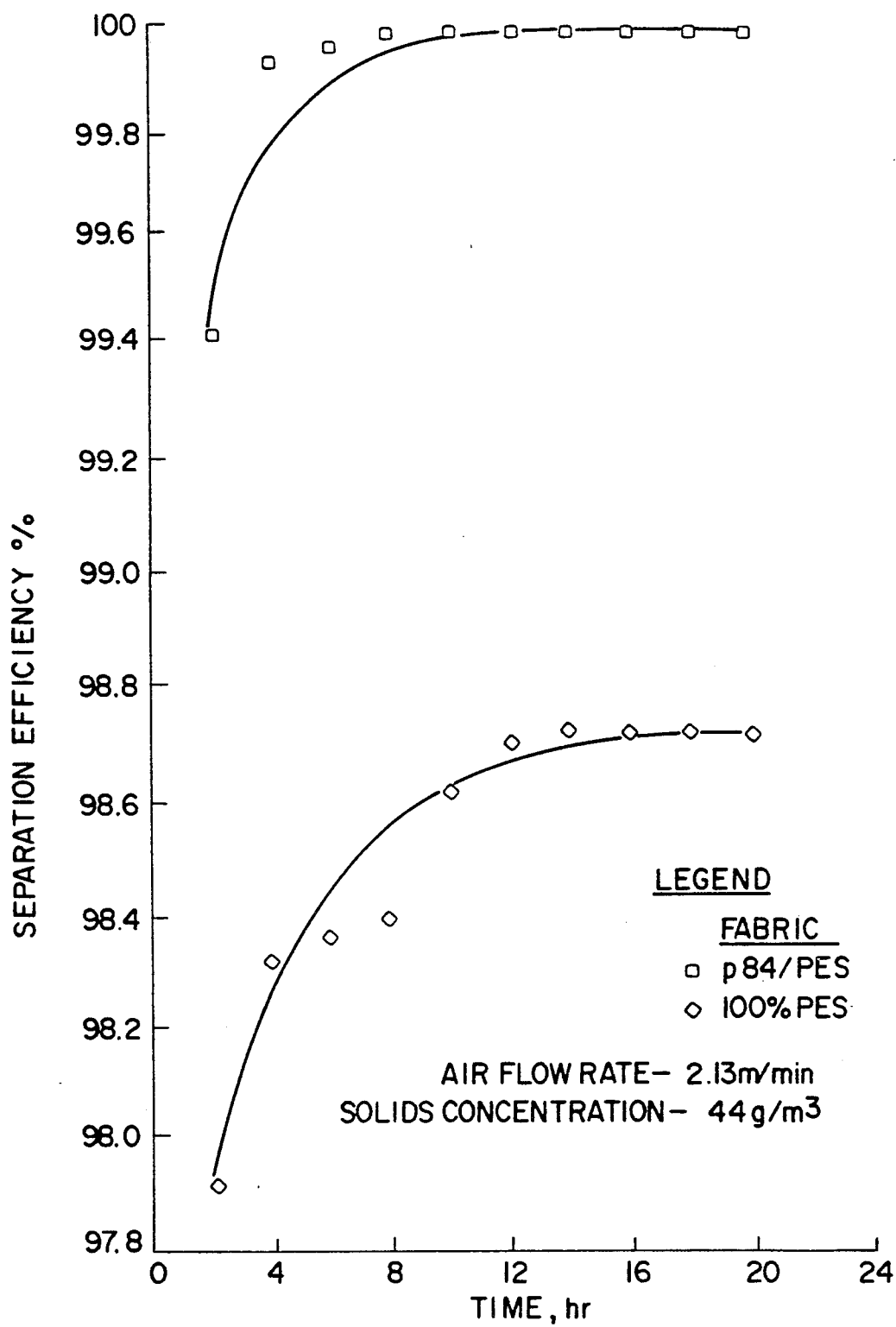
FIG. 5 shows comparative test results of a composite filter fabric and a conventional (control) filter fabric.

The separation efficiencies were found to increase from a lower value and then become invariant after about 10 hours of filtration. However, the separation efficiencies were significantly higher for P84 Polyimide/Polyester fabric than for 100% Polyester fabric at all operating conditions. The lowest value of the separation efficiency recorded for P84 Polyimide/Polyester at the beginning of data acquisition was 98.899%. The equivalent value for 100% Polyester was much lower at 97.721%. Also for HPEC Polyimide/Polyester, the asymptotic values ranged from a minimum of 99.936% to a maximum of 99.992%. The equivalent values for 100% Polyester were significantly lower at 98.605% and 99.918%, respectively. The change in separation efficiency with time for one set of operating conditions is shown in graphical form in FIG. 5, and this typifies the results of all runs.

The pressure buildup increased with time and then became invariant at about the same time as the separation efficiency reached an asymptotic value. For all operation conditions, the pressure buildup remained significantly lower for the P84 Polyimide/Polyester composite fabric.

Table 2 contains the separation efficiency and pressure buildup after 20 hours of filtration for different air flow rates for both 100% Polyester and P84 Polyimide/Polyester fabrics. The results showed that, for the p84Polyimide/Polyester fabric, an increase in the air flow rate from 1.22 m/min to 1.52 m/min resulted in an increase in the separation efficiency recorded. Beyond 1.52 m/min, the separation efficiency remained nearly constant as the air flow rate was increased.

Table 2 also shows the effect of air flow rate on the pressure buildup. For the P84 Polyimide/Polyester filter, the pressure buildup did not change appreciably although the separation efficiency increased.

For 100% Polyester filter, the pressure buildup increased with increasing air flow rate.

It will be apparent that many changes may be made to the illustrative embodiment, while falling within the scope the invention and it is intended that all such changes be covered by the claims appended hereto.

We claim:
1. A composite filter fabric for the removal of fine particulate matter from a fluid stream comprising:
   a first layer consisting only of staple fibers of P84 polyimide polymer consolidated through entanglement of said fibers by a needle punching operation to form a discrete fabric;
   a discrete substrate layer of a depth filtration filter fabric secured to said first layer;
   fibers of said depth filtration filter fabric differing from the staple fibers and having a diameter at least equal to that of said staple fibers; and
   said first layer and said substrate layer being secured by needle punching the fibers of at least one said layer into the fibers of the other said layer.

2. A composite filter fabric as defined in claim 1, wherein said layers are secured together to produce an entanglement of the fibers of each said layer within the fibers of the other layer.

3. A composite filter filter fabric as defined in claim 2, wherein said entanglement of the fibers of each layer with the fibers of the other layer is limited whereby the fibers of the substrate layer do not penetrate the outer surface of the first layer.

4. A composite filter fabric as defined in claim 1, wherein said fibers of said substrate filter fabric are formed from an organic polymer.

5. A composite filter fabric as defined in claim 4, wherein said organic polymer is selected from the group consisting of polyesters, polypropylene, polyethylene, nylons, aromatic polyamides, polyacrylonitrile, polyphenylene sulfide, polytetrafluoroethylene and polybenzimidazole.

6. A composite filter fabric as defined in claim 1, wherein said substrate layer is in the form of a nonwoven fabric commingled with a scrim.

7. A composite filter fabric as defined in claim 6, wherein said substrate layer is a polyester.

8. A composite filter fabric as defined in claim 1, wherein said first layer comprises at least about 5% by weight of the weight of the filter fabric.

9. A composite filter fabric as defined in claim 8, wherein said first layer comprises from about 25% to about 35% by weight of the weight of the filter fabric.

10. A composite filter fabric as defined in claim 1, wherein said fibers of said substrate layer have a diameter of at least about 1.5 times that of the diameter of fibers of said first layer.

TABLE 2

| | | Effect of Air Flow rate on Separation efficiency and pressure buildup after 20 hours of filtration | | | |
|---|---|---|---|---|---|
| | | SEPARATION EFFICIENCY, % | | PRESSURE BUILDUP, inches of water | |
| CONC., g/m$^3$ | AIR FLOW RATE, m/min | P84 Polyimide/Polyester | 100% Polyester | P84 Polyimide/Polyester | 100% Polyester |
| | 1.22 | 99.952 | 99.740 | 2.6 | 3.6 |
| 11 | 1.52 | 99.989 | 99.570 | 2.6 | 3.9 |

11. A composite filter fabric as defined in claim 1, wherein said fibers of said substrate layer have a diameter of about 1.5 to about 4 times that of the diameter of the fibers of said first layer.

12. A composite filter fabric as defined in claim 1, wherein said fibers of said first layer have a diameter of about 2 denier and said fibers of said substrate layer have a diameter of about 6 denier.

13. A composite filter fibric for the removal of fine particulate matter from a gas stream comprising
    a first layer consisting only of a nonwoven P84 polyimide fiber fabric;
    a discrete substrate layer comprising a depth filtration filter fabric secured to said first layer,
    said layers being secured by needle punching;
    said fibers of said substrate layer differing from the fibers of said first layer and having a diameter greater than the fibers of said first layer;
    said composite filter fabric having a permeability greater than that of a fabric of similar weight and thickness formed from fibers of said first layer only.

14. A composite filter fabric as defined in claim 13, wherein said depth filtration filter fabric is formed from staple polyester fibers consolidated together by needle punching.

15. A composite filter fabric as defined in claim 14, wherein said diameter of said fibers forming said substrate layer is about 3 times the diameter of said fiber of said first layer.

16. A composite filter fabric as defined in claim 14, wherein said layers are secured together by said needle punching to entangle the fibers of said first layer with fibers of said substrate layer and vice-versa.

17. A composite filter fabric as defined in claim 16, wherein said entanglement of the fibers of each layer with the fibers of the other layer is limited whereby the fibers of the substrate layer do not penetrate the outer surface of the first layer.

18. A composite filter fabric as defined in claim 13, wherein said layers are secured together by needle punching to entangle some of the fibers of each said layer with the fibers of the other layer.

19. A composite filter fabric as defined in claim 18, wherein said entanglement of the fibers of each layer with the fibers of the other layer is limited whereby the fibers of the substrate layer do not penetrate the outer surface of the first layer.

20. A composite filter fabric as defined in claim 13, wherein said fibers of said substrate layer are formed from an organic polymer.

21. A composite filter fabric as defined in claim 20, wherein said organic polymer is selected from the group consisting of polyesters, polypropylene, polyethylene, nylons, aromatic polyamides, polyacrylonitrile, polyphenylene sulfide, polytetrafluoroethylene and polybenzimidazole.

22. A composite filter fabric as defined in claim 13, wherein said substrate layer is in the form of a nonwoven fabric commingled with a scrim.

23. A composite filter fabric as defined in claim 22, wherein said substrate layer is a polyester.

24. A composite filter fabric as defined in claim 13, wherein said first layer comprises at least about 5% by weight of the weight of the filter fabric.

25. A composite filter fabric as defined claim 24, wherein said first layer comprises from about 25% to about 35% by weight of the weight of the filter fabric.

26. A composite filter fabric as defined in claim 11, wherein said fibers of said substrate layer have a diameter of at least about 1.5 times that of the diameter of fibers of said first layer.

27. A composite filter fabric as defined in claim 13, wherein said fibers of said substrate layer have a diameter of about 1.5 to about 4 times that of the diameter of the fibers of said first layer.

28. A composite filter as defined in claim 13, wherein said fibers of said first layer have a diameter of about 2 denier and of said substrate layer have a diameter of about 6 denier.

* * * * *